United States Patent [19]

Sou et al.

[11] Patent Number: 4,894,859

[45] Date of Patent: Jan. 16, 1990

[54] APPARATUS FOR CONNECTING A PLURALITY OF CHANNELS

[75] Inventors: Takayoshi Sou; Toshio Oshima; Kazuhiko Nakamura, all of Tokyo, Japan

[73] Assignee: NEC Corporation, Japan

[21] Appl. No.: 277,405

[22] Filed: Nov. 28, 1988

Related U.S. Application Data

[63] Continuation-in-part of Ser. No. 880,702, Jul. 1, 1986, abandoned.

[30] Foreign Application Priority Data

Jul. 5, 1985 [JP] Japan ................................. 60-146469

[51] Int. Cl.[4] ............................................. H04M 3/56
[52] U.S. Cl. ...................................... 379/204; 379/205
[58] Field of Search ............... 379/201, 203, 202, 204, 379/205, 206, 157, 158, 165, 53, 54; 370/62

[56] References Cited

U.S. PATENT DOCUMENTS 3,441,678  4/1969  Budlong et al. ................... 379/204
4,611,095  9/1985  LeBlanc et al. ................... 379/204

Primary Examiner—James L. Dwyer
Attorney, Agent, or Firm—Laff, Whitesel, Conte & Saret

[57] ABSTRACT

The channel connecting apparatus is constituted by a plurality of network control units for interconnecting terminal devices and channels connected to remote parties, a control signal transmission/reception circuit which includes a detector for detecting an acknowledge signal and a channel close instruction signal to send the detected informations, and a generator for sending the acknowledge signal and the channel close instruction signal to the channels through the network control units. There are also provided a control panel, a memory circuit for storing connecting informations supplied from the control panel, and a controller responsive to the outputs of the control signal transmisison/reception circuit and the control panel for interconnecting channels and the terminal devices when the acknowledge signal is received and for closing the channels when the channel close instruction signal is received.

4 Claims, 5 Drawing Sheets

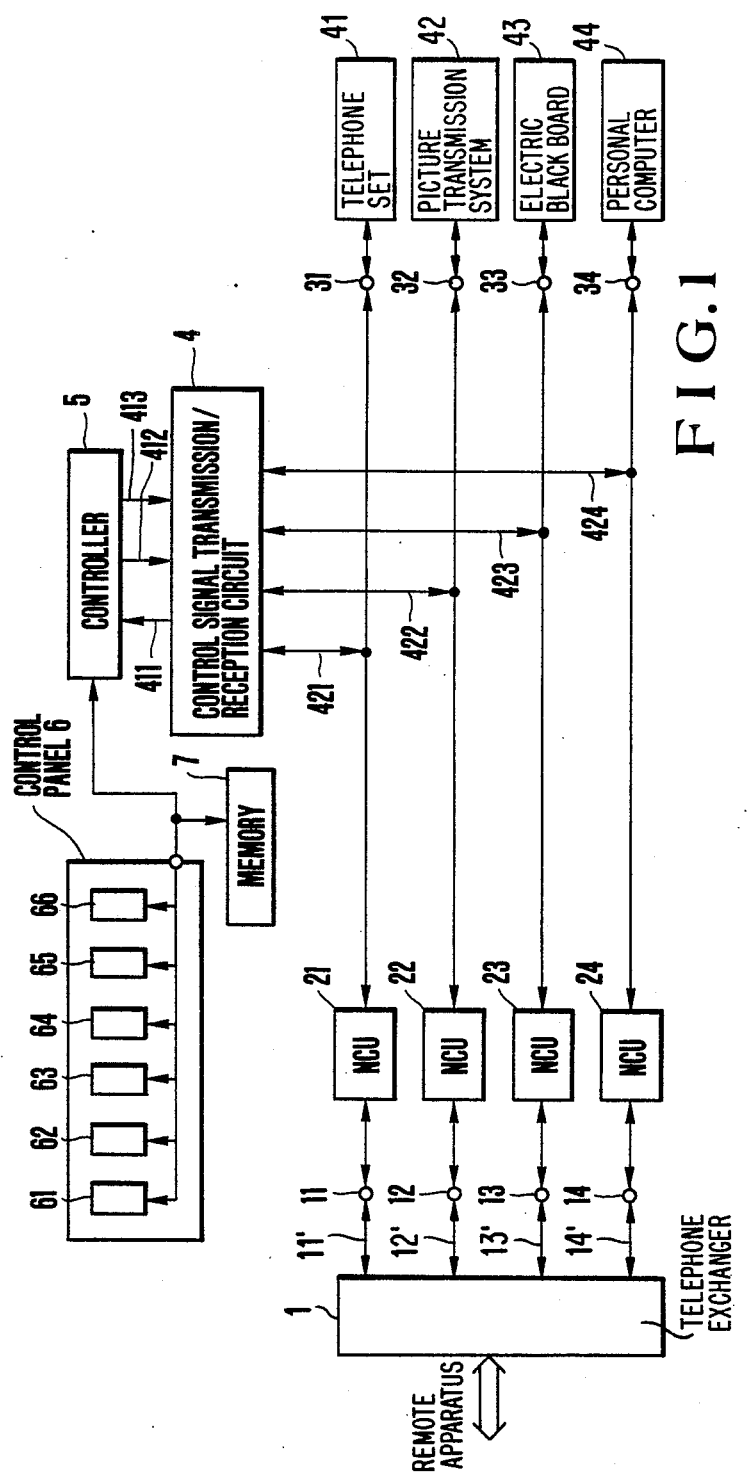
F I G. 1

APPARATUS FOR CONNECTING A PLURALITY OF CHANNELS

This is a continuation-in-part of Ser. No. 880,702 filed July 1, 1986, now abandoned.

BACKGROUND OF THE INVENTION

This invention relates to channel connecting apparatus for connecting telephone channels or lines, and more particularly channel connecting apparatus for connecting a plurality of channels for simultaneously exchanging information among a plurality of parties. Television conference system has been developed in which a conference can be made between remote conference rooms by using television image signals and voice signals just in the same manner as in a single conference room.

In each conference room of the typical television conference system, there are various terminal devices, such as a telephone set, a picture transmission system, an electronic blackboard, etc. At least three telephone channels are required for making a connection between two conference rooms having a conference with each other, that is, at least three telephone numbers must be dialed when the telephone channels are connected.

General data communication terminal devices have no function for connecting themselves with a public telephone line, a subscriber telephone line, or an internal line of PBX. These devices do not behave in the same manner as the telephone set. Some have interface functions, such as, for example, starting a telephone exchanger. A transmission of a restore signal and a selection signal, and a detection of a calling signal, is required to perform the connection between the terminal device and the telephone channel. Such an interface is made to a worldwide standard and is named a telephone network control unit (NCU) in Japan or a data access arrangement (DAA) in United States.

There are automatic response type, manual transmission/automatic response type, and manual transmission/manual response type NCU's with respect to operation types. Prior art television conference system described above comprises a combination of the network control unit capable of manual transmission and automatic reception, and a connecting device capable of connecting lines by an one touch operation by storing a telephone number of a called party, thereby enabling channel connection in channel units.

However, in such system it is necessary to provide the network control unit and the connecting device for each one of a plurality of channels, and to effect connection/disconnection or open/close operations for each channel. Accordingly, not only the channel connection operation is troublesome for skilled persons but also unskilled persons can not readily use the system. Further, at the time of automatic transmission in the prior art telephone network control unit, whether a channel is connected to a called party or not is judged by detecting whether a polarity inversion of a channel signal has been carried out or not. However, in a recent PBX (Private Branch Exchange), a polarity inverted signal is not sent back, thereby disabling the automatic transmission to a called party. There are also such defects that, at the time of completing a conference, the user merely turns off a source of power but fails to disconnect the channel or the channel is continuously reserved when a called party disconnects the channel but the calling party does not disconnect the channel.

SUMMARY OF THE INVENTION

Accordingly, it is an object of this invention to provide improved apparatus for connecting a plurality of channels which permits users of a television conference system to readily connect and disconnect the channels.

According to this invention there is provided apparatus for connecting a plurality of channels comprising a plurality of telephone network control units for interconnecting telephone channels respectively connected to a plurality of remote apparatus and a plurality of terminal devices; a control signal transmission/reception circuits connected to respective joints of the terminal devices and the telephone network control units, said transmission/reception circuit detecting an acknowledge signal and a channel closing instruction signal sent from the remote apparatus through the telephone network control units to send out detected informations, and sending the acknowledge signal in response to a first control signal and the channel close instruction signal in response to a second control signal to the channel through the telephone network control unit; a control panel including means for inputting an information regarding connection of the channels and means designating connection and disconnection of the channels; memory means for storing the connecting information inputted from the control panel; and control means for outputting the first and second control signals to the control signal transmission/reception circuit when a calling signal is received from said remote apparatus and when an instruction designating disconnection of the channel is received from the control panel, respectively, and, responsive to an output of the control signal transmission/reception circuit and an output of the control panel for controlling respective telephone network control units so as to interconnect the channels and the terminal devices when the acknowledge signal is received from the remote apparatus and to close the channels when the channel close instruction signal is received from the remote apparatus.

According to a modified embodiment, switching circuits are connected between the control signal transmission/reception circuit and respective network control units so that tones of the acknowledge signal and the channel close instruction signal are inhibited from being sent to the terminal devices.

BRIEF DESCRIPTION OF THE DRAWINGS

In the accompanying drawings:

FIG. 1 is a block diagram showing one embodiment of the apparatus for connecting a plurality of channels according to this invention;

DESCRIPTION OF THE PREFERRED EMBODIMENTS

Figure 2:
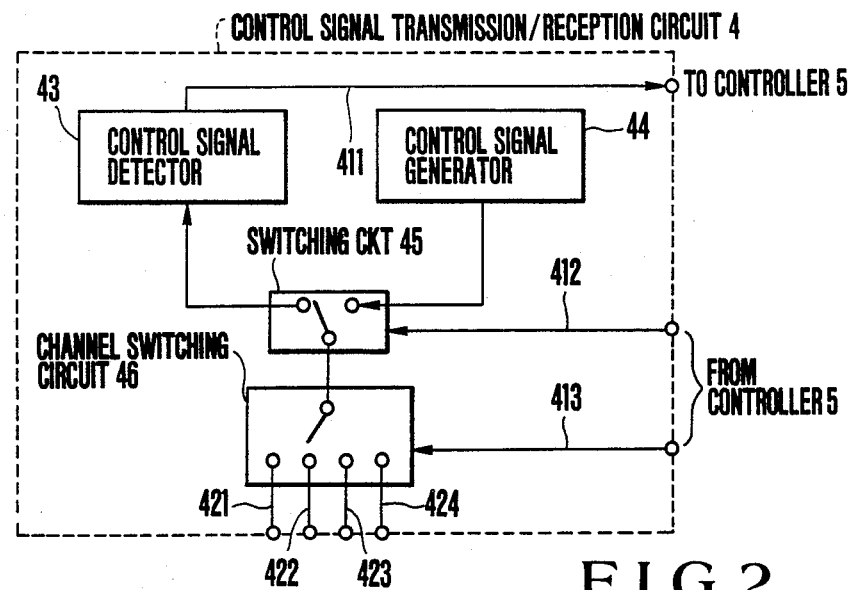
FIG. 2 is a block diagram showing one example of a control signal transmission/reception circuit utilized in the embodiment shown in FIG. 1.

In FIG. 1 showing a preferred embodiment of this invention applied to a television conference system, terminals 11, 12, 13 and 14 of a plurality of telephone network control units (referred to as NCU hereinafter) 21, 22, 23 and 24 are connected to remote parties through respective channels, 11', 12',13' and 14' and a telephone exchanger. Opposite terminals 31, 32, 33 and 34 respectively corresponding to terminals 11–14 of NCU's 21–24 are connected to conference terminal devices a telephone set 41, a picture transmission system 42, an electric black-board 43, and a personal computer 44, respectively. Terminals 31–34 of NCU's 21–24 are connected through lines 421, 422, 423 and 424 to a control signal transmission/reception circuit 4 which detects a control signal sent from the remote party and sends the control signal to the remote party. The control signal transmission/reception circuit 4 is connected to a controller 5 through lines 411, 412 and 413. The controller 5 is connected to the output terminals of a control panel 6 which sends various instructions for example, a telephone number of the remote apparatus, an instruction indicating the connection of a channel, and an instruction indicating the closing of a channel, to the controller 5. A memory device 7 storing telephone numbers of remote telephone sets to be connected is connected to the output terminal of the control panel 6. Under the control of the controller 5, NCU's 21–24 effect connection and disconnection of the channels of remote parties through terminals 11-14 respectively as well as connection and disconnection of the channels of conference terminal devices respectively through terminals 31–34.

The functions of the controller 5 will be described below.

(1) In a case where a channel connection is to be performed at the calling side in accordance with an instruction from the control panel 6, the controller 5 starts the NCU 21 connected with the telephone set 41 and outputs a telephone number, indicated by the instruction, to the telephone exchanger 1 via the channel 11'.

The control signal transmission/reception circuit 4 detects the acknowledge signal received from the remote apparatus through the telephone exchanger 1 and the terminal 11, and outputs a detection information to the controller 5. The controller 5 controls the NCU 21 to connect the telephone set 41 to the remote apparatus.

(2) In a case of a channel connection, when the controller 5 is at the called side, a calling signal originated from the remote apparatus is sent through the telephone exchanger 1, the channel 11' and the NCU 21 which detects the calling signal. The controller 5 outputs a control signal to cause the control signal transmission/reception circuit 4 to output an acknowledge signal. The acknowledge signal is sent to the remote apparatus by way of the NCU 21, the channel 11, and the telephone exchanger 1.

(3) In a case of a channel disconnection, when the controller 5 is at the calling side, a channel close instruction, for example, is received to close channel 14' which is connected with the personal computer 44 from the control panel 6. The controller 5 outputs a control signal to cause the control panel signal transmission/reception circuit 4 to output the channel close signal to the channel 14' for a predetermined duration, and, then, causes the NCU 24 to close channel 14'.

(4) In a case of a channel disconnection, the control signal transmission/reception circuit 4 at the receiving side detects and informs the controller 5 that the channel close signal has NCU 24. Then the channel 14' is closed after a predetermined time.

One example of the construction of the control signal transmission/reception circuit 4 is shown in FIG. 2. As shown, the control signal transmission/reception circuit 4 comprises a control signal detector 43, a control signal generator 44, a switching circuit 45, and a channel or line switching circuit 46. In response to a switching signal supplied from the controller 5 via a line 412, the switching circuit 45 selectively connects the channel switching circuit 46 to control signal detector 43 or control signal generator 44. In response to a channel switching signal supplied from controller 5 over line 413, the channel switching circuit 46 selectively connects the switching circuit 45 to either one of the terminals 31–34 of NCU's 21–24 via lines 421–424. The control signal detector 43 detects a control signal that is an acknowledge signal or a channel close instruction signal and sends information representing the detection of these signals to the controller 5. The control signals are sine wave signals having a frequency of 2100 Hz and continuing for 5 seconds.

Figure 3:
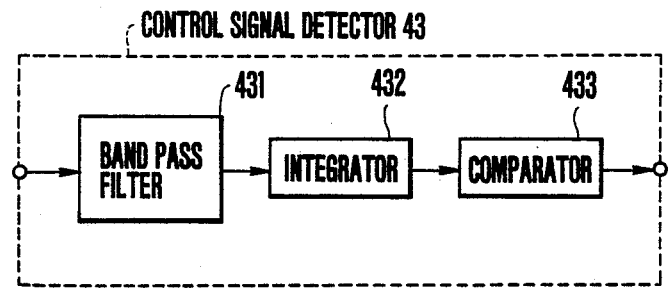
FIG. 3 is a block diagram showing one example of a control signal detector shown in FIG. 2.

One example of the construction of the control signal detector 43 is shown in FIG. 3. As shown, the control signal detector 43 comprises a bandpass filter 431 passing a signal of 2100 Hz, a CR integrator 432 integrating the output of the bandpass filter 431 , and a comparator 433 comparing the output of the integrator 432 with a signal of a definite level, thereby detecting the control signal of 2100 Hz. The control signal generator 44 comprises an oscillator generating the control signal of 2100 Hz.

With the construction described above, when the switching circuit 45 selects the control signal generator 44 in response to the switching signal supplied from controller 5 over line 412, a control signal which is the acknowledge signal or the channel close instruction signal of 2100 Hz is sent to a channel selected by the channel switching circuit 46, in accordance with the channel switching signal supplied through line 413.

Figure 4:
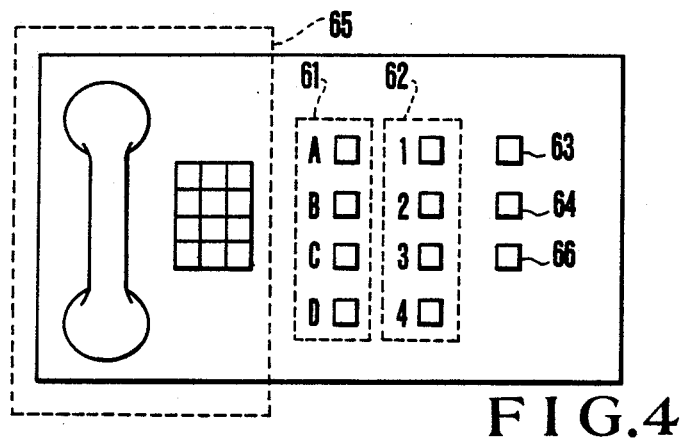
FIG. 4 is a upper view showing one example of the control panel shown in FIG. 1.

FIG. 4 shows the detail of the control panel 6 comprising a switch group 61 designating a remote party to be connected, a switch group 62 designating channels to be connected, a switch 63 instructing the channel connection, a switch 64 instructing the channel close, a telephone set 65, and a switch 66 designating storing telephone numbers.

The controller 5 is constituted by a microprocessor and controls respective NCU's 21–24 and signal transmission/reception circuit 4 in response to an instruction from control panel 6 and the channel close instruction from the control signal transmission/reception circuit 4 for controlling connection and disconnection of a plurality of channels.

Figures 5A, 5B, 5C:
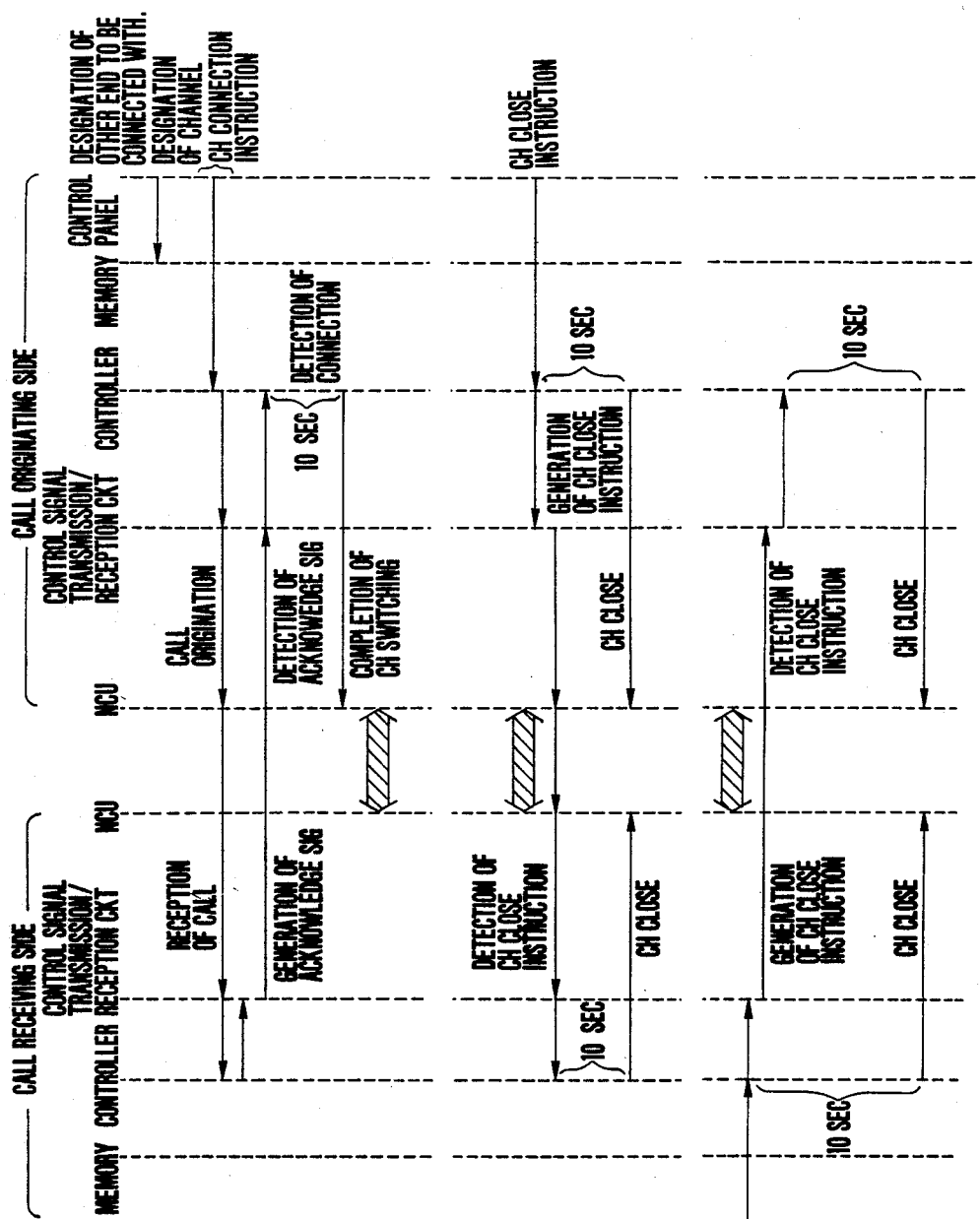
FIGS. 5A, 5B and 5C are sequence diagrams useful to explain the operation of the embodiment shown in FIG. 1.

The operation of the apparatus shown in FIG. 1 will be described as follows with reference to sequence diagram shown in FIGS. 5A, 5B and 5C. In FIGS. 5B and 5C, each of perpendicular dot lines corresponds to that of FIG. 5A.

(1) A call originating operation of a channel connection

FIG. 5A shows call originating and call receiving operations of a channel connection. For example, when a switch A of the switch group 61 of the control panel 6 is closed to designate a party A to be connected, and switches 1, 2 and 3 of the switch group 62 are closed to designate channels 1, 2 and 3 and then when the channel connection instruction switch 63 is closed, the telephone numbers of channels 1, 2 and 3 of the called party A are read out from the memory device 7 and these telephone numbers are supplied to controller 5. Then controller 5 starts a NCU 21 to call the channel 1 of the called party A. When the NCU in the called party A confirms a paging, it generates an acknowledge signal 50. The control signal transmission/reception circuit 4 effects switching between the switching circuit 45 and the channel switching circuit 46 so as to supply the output of NCU 21 to the control signal detector 43 for awaiting the acknowledge signal from the called party A. When the acknowledge signal is received and confirmed by the controller 5, after elapse of 10 seconds, the terminals 11 and 31 are interconnected in NCU 21 thus completing connection of channel 1. Then, by the same procedure as for channel 1, channels 2 and 3 are connected, thus completing the connection operations.

(2) Call receiving operation of channel connection

As shown in FIG. 5A, the controller 5 on the call receiving side constantly supervises presence or absence of call signals to NCU's 21–24. When the call signal is received, the acknowledge signal is sent out from the control signal generator 44 to a channel which has received the call signal through the switching circuit 45 and the channel switching circuit 46 of the control signal transmission/reception circuit 4 under the control of the controller 5. 10 seconds later, terminals 11 and 31, 12 and 32, 13 and 33 or 14 and 34 are interconnected in a NCU, thereby completing the channel connection.

(3) Call originating operation for channel closing

FIG. 5B shows a call originating operation for channel closing. As the channel close instruction switch 64 of the control panel 6 is closed, all channels which have been connected are closed. When a switch which corresponds to a channel desired to be interrupted in the switch group 62 is closed prior to the closure of the channel close instruction switch 64, only the designated channel would be closed. For example, when the switch 1 in the switch group 62 is closed and then the channel close instruction switch 64 is closed, a control signal of the channel close instruction is sent to the controller 5 from the control panel 6. The controller 5 controls the switching circuit 45 and the channel switching circuit 46 of the control signal transmission/reception circuit 4 in accordance with the control signal for sending out an channel close instruction signal to the channel 1 from the control signal generator 44. After elapse of 10 seconds, the controller 5 controls NCU 21 to disconnect the channel 1, thus completing the channel closing of channel 1.

(4) Call receiving operation of channel closing

FIG. 5C shows the call receiving operation of the channel closing. Upon completion of the connection of channels, the controller 5 monitors the reception of the channel close instruction signal by sequentially connecting the channels to the control signal detector 43 by controlling the channel switching circuit 46 of the control signal transmission/reception circuit 4. 10 seconds after reception of the channel closing instruction signal, the channel is closed.

Where a telephone number is inputted, the telephone number is keyed-in by the telephone set 65 in the control panel 6. Then the information regarding to the remote telephone to be connected is inputted by the switch groups 61 and 62 of the remote apparatus so as to store the information in memory device 7 with a memory designation switch 66.

Figure 6:
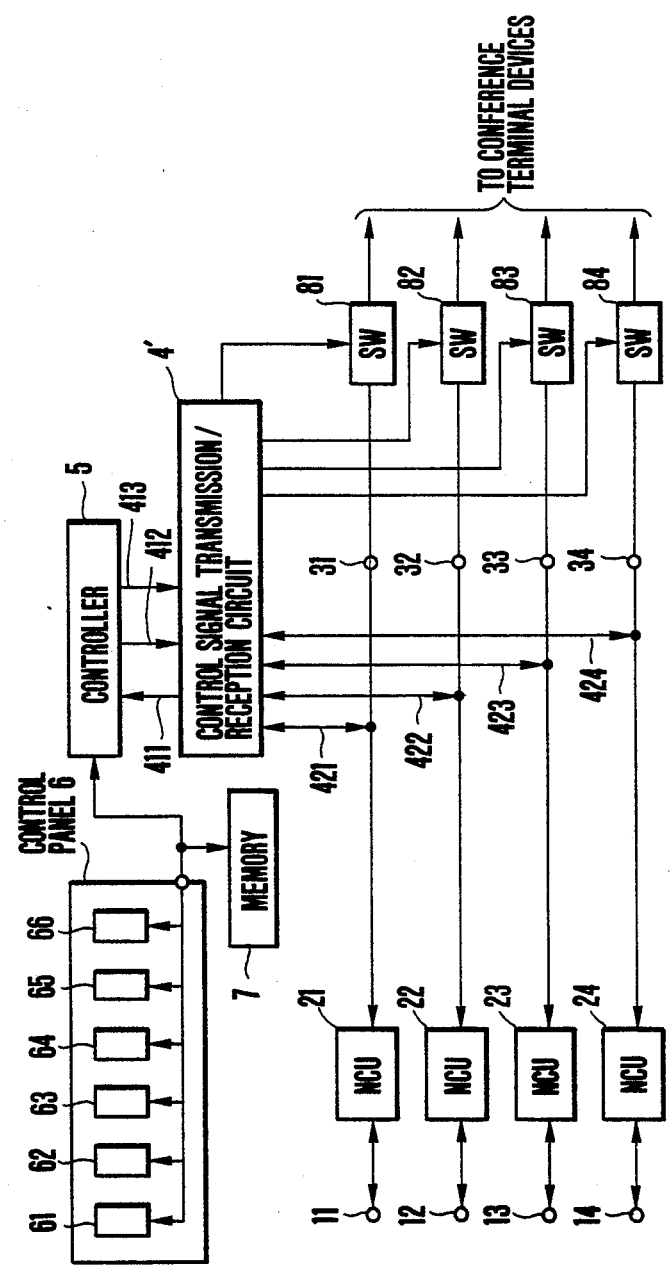
FIG. 6 is a block diagram showing another embodiment of this invention.

FIG. 6 illustrates another embodiment of the apparatus for connecting a plurality of channels according to this invention which is different from the first embodiment shown in FIG. 1 in that switching circuits 81–84 are connected between conference terminal device terminals 31–34 of respective NCU's 21–24 and respective terminal devices (not shown) of the television conference system. The switching circuits 81–84 individually connect and disconnect the circuits in accordance with control signals sent from controller 5 via control signal transmission/reception circuit 4'. When the channels are closed (or disconnected), the corresponding switching circuits 81–84 are cut off or in open state. Each of the switching circuits 81–84 conducts or becomes in closed state a predetermined time after generation or reception of the acknowledge signal, and cut off a predetermined time before generation of the channel close instruction signal.

Figures 7A, 7B, 7C:
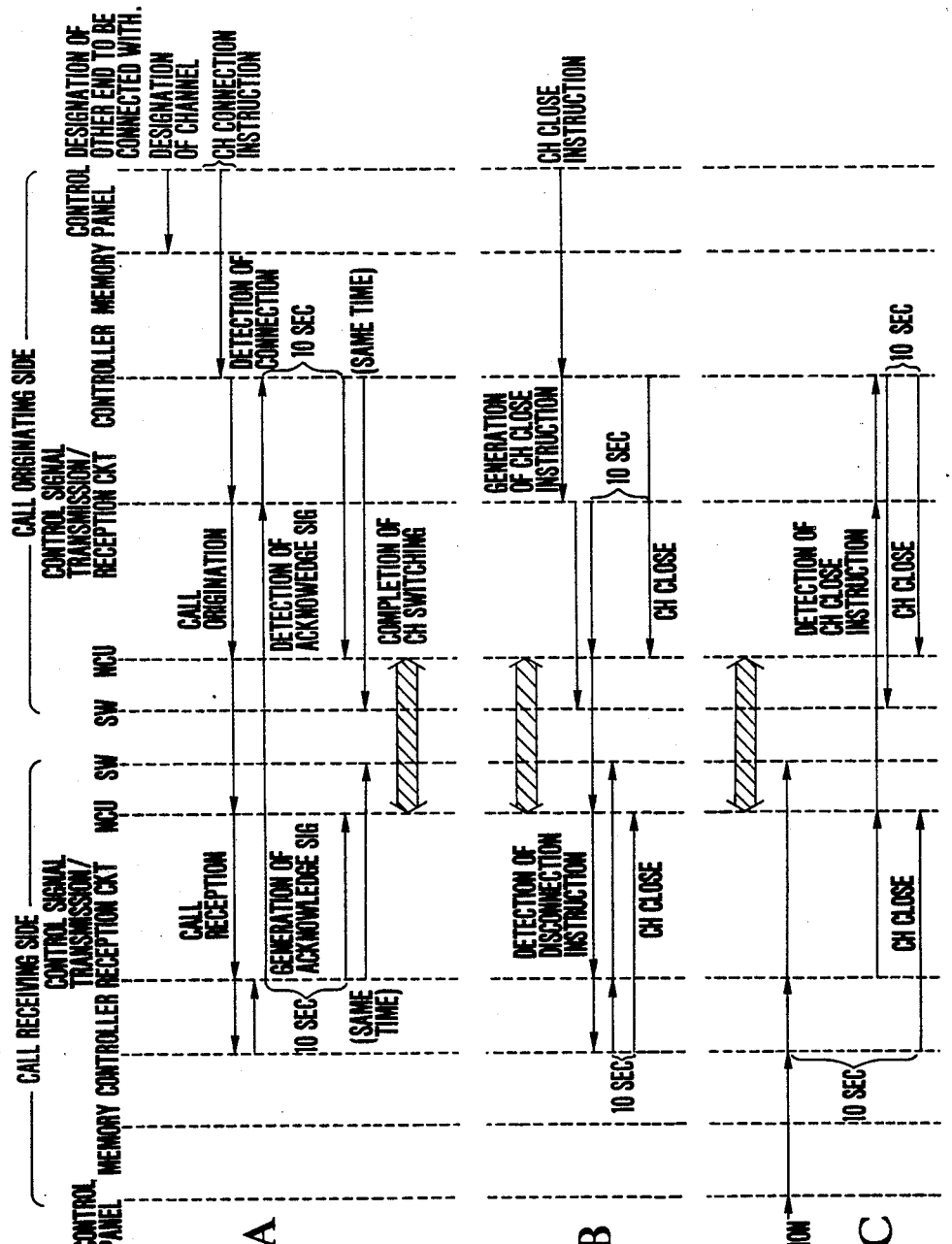
FIGS. 7A, 7B and 7C are sequence diagrams useful to explain the operation of the modified embodiment shown in FIG. 6.

FIGS. 7A, 7B and 7C are sequence diagrams respectively showing call originating and call receiving operations for channel connection, a call origination operation for channel closing and a call receiving operation for channel closing of the embodiment shown in FIG. 6

(1) The call originating operation for connecting a channel is different from that shown in FIG. 1 in that 10 seconds after controller 5 on the call originating side has confirmed the reception of the acknowledge signal of channel 1, for example, sent from a remote apparatus, the switching circuit 81 corresponding to channel 1 becomes closed state and the terminals 11 and 31 are interconnected in NCU 21 whereby the connection is completed.

(2) The call receiving operation of the channel connection is different from that shown in FIG. 1 in that 10 seconds after the call receiving side has sent out an acknowledge signal through channel 1, for example, the switching circuit 81 corresponding to the channel is become in closed state and that the terminals 11 and 31 are interconnected in a NCU thus completing channel connection.

(3) The call origination operation for closing a channel is different from that of FIG. 1 in that immediately after the call originating side has issued an channel close instruction signal through channel 1, for example, the switching circuit 81 become open state and the after elapse of 10 seconds the connection between terminals 11 and 31 is disconnected in NCU thereby completing the closing of the channel.

(4) The call receiving operation of the channel closing is different from that shown in FIG. 1 in that when the call receiving side receives the channel close instruction signal through channel 1, for example, immediately thereafter the switching circuit 81 is opened and then after an elapse of 10 seconds the NCU is opened thereby closing the channel.

In accordance with the above described operation, the connecting apparatus shown in FIG. 6 is controlled in such manner as that the acknowledge signal and the channel close instruction signal are not sent to the terminal devices.

As above described, according to this invention, since the controller 5 and the control signal transmission/reception circuit 4 are provided, the channel connection of a television conference apparatus or the like can be made by one touch operation. Moreover, an automatic connection becomes possible for PBX in which a polarity inverted signal is not sent back. Even when an operator fails to close a channel, there is no increase in the rates due to reserving the channel.

Although in the foregoing embodiments four channels were used, it will be understood that the number of channels is not limited to 4.

What is claimed is:

1. Apparatus for connecting a plurality of channels comprising:

A plurality of line interface means for interconnecting channels respectively connected to a plurality of remote apparatus and a plurality of terminal devices;

a control signal transmission/reception circuit connected to terminal device side terminals of respective network control units, said control signal transmission/reception circuit detecting an acknowledge signal and a channel close instruction signal which are originated from said remote apparatus received through said line interface means to send out detected information and sending said acknowledge signals in response to a first control signal and said channel close instruction signals in response to second control signal to said channels through said line interface means;

a control panel including means for inputting an information regarding connection of said channels and means designating connection and disconnection of said channels;

memory means for storing said connecting information inputted from said control panel; and control means for outputting the first and second control signals to said control signal transmission/reception circuit when a calling signal is received from said remote apparatus and when an instruction designating the disconnection of the channel is received from said control panel, respectively, and, responsive to the detected information output of said responsive to the detected information output of said control signal transmission/reception circuit and an output of said control panel for controlling respective line interface means so as to interconnect said channels and the terminal devices when said acknowledge signal is received from said remote apparatus and to close said channels when said channel close instruction signal is received from said remote apparatus.

2. Apparatus for connecting a plurality of channels comprising:

a plurality of line interface means with one terminals connected to channels respectively connected to a plurality of remote apparatus;

a plurality of switch means connected between the other terminals of said line interface means and terminal devices;

a control signal transmission/reception circuit connected to terminal device side terminals of said line interface means, said control signal transmission/reception circuit detecting an acknowledge signal and a channel close instruction signal which are originated from said remote apparatus and received through said network control units to send out detected information;

said control signals transmission/reception circuit sending said acknowledge signal in response to a first control signal and said channel close instruction signal in response to a second control signal through said line interface means to said channels 1;

a control panel including means for inputting information regarding channel connections and means designating connection and disconnection of said channels;

memory means for storing said connection information inputted from said control panel; and control means for outputting the first and second control signals to said control signal transmission/reception circuit when a calling signal is received from said remote apparatus and when an instruction designating the disconnection of the channel is received from said control panel, respectively, and, responsive to the directed output of said control signal transmission/reception circuit and an output of said control panel for controlling said line interface means and said switching means for sending out to said channels said acknowledge signal when a call is received, and sending said channel close instruction signal at the time of channel closing, said control means connecting said channels to said terminal devices when said acknowledge signal is received from said remote apparatus, disconnecting said channels when said channel close instruction signal is received from said remote application putting on said switch means at or a predetermined time after generation of said acknowledge signal, putting off said switch means a predetermined time before generation of said channel close instruction signal, and controlling said acknowledge signal and said channel close instruction signal generated in said apparatus so that they are not always to be sent to said terminal devices of said apparatus.

3. The apparatus according to claim 1 wherein said control signal transmission/reception circuit comprises control signal detecting means for detecting said acknowledge signal and said channel close instruction signal to send detected signals to said control means; control signal generating means for generating said acknowledge signal and said channel close instruction signal; channel switching means responsive to a channel switching signal sent from said control means for selecting one of said line interface means; and switching means responsive to a control signal from said control means for connecting said network control unit selected by said channel switching means to either one of said control signal detecting means and said control signal generating means.

4. The apparatus according to claim 2 wherein said control signal transmission/reception circuit comprises control signal detecting means for detecting said acknowledge signal and said channel close instruction signal to send detected signals to said control means; control signal generating means for generating said acknowledge signal and said channel close instruction signal; channel switching means responsive to a channel switching signal sent from said control means for selecting one of said network control units; and switching means responsive to a control signal from said control means for connecting said line interface means selected by said channel switching means to either one of said control signal detecting means and said control signal generating means.

* * * * *